United States Patent [19]

Lewis

[11] 4,277,096

[45] Jul. 7, 1981

[54] TELESCOPING REACH ROD FOR GATE AND RAMP DEVICE WITH LIFT DECK

[75] Inventor: Mack A. Lewis, Sioux City, Iowa

[73] Assignee: Wilson Trailer Company, Sioux City, Iowa

[21] Appl. No.: 81,024

[22] Filed: Oct. 1, 1979

[51] Int. Cl.³ ............................................. B62D 33/04
[52] U.S. Cl. .................................. 296/24 C; 49/109; 119/9
[58] Field of Search ................. 296/24 C, 202, 50, 51, 296/53, 55, 56, 57 R, 61, 24 R; 119/9, 82, 15, 19; 49/109, 114

[56] References Cited

U.S. PATENT DOCUMENTS

| 2,569,624 | 10/1951 | Wychowaniec et al. | 49/109 |
| 3,292,967 | 12/1966 | Peek | 296/24 R |
| 4,153,289 | 5/1979 | Lewis et al. | 296/24 C |

FOREIGN PATENT DOCUMENTS 1023402  12/1977  Canada ................................. 280/24 C

*Primary Examiner*—John P. Silverstrim
*Assistant Examiner*—Norman L. Stack, Jr.
*Attorney, Agent, or Firm*—Harvey B. Jacobson

[57] ABSTRACT

A drop center livestock trailer is provided with a deck which is vertically adjustable within the trailer body to two separate positions for accommodating various forms of livestock and freight. A sectional gate structure which extends for either the full or a part of the inside trailer width is incorporated in the trailer for assuming a first position in which it acts as a gate limiting the movement of livestock in the trailer and a second position wherein it supports a ramp for facilitating the loading and unloading of the livestock. The ram is pivotally attached to one end of the movable deck and is supported by a lower section of the sectional gate structure. The ramp is allowed to drop from its normal horizontal to an inclined position by moving the lower section of the gate structure to an inclined position. Connected to the lower gate section is an upper gate section which is pivotally connected to the sidewalls of the trailer. The upper gate section is connected to the lower section by a connecting rod so that the lower section is rotated from its normal vertical position to the inclined position. The connecting rod consists of two telescopingly related portions and is capable of assuming two positions for adjusting the effective length thereof. In this manner, the angle of inclination of the lower section of the gate structure is adjustable for supporting the ramp when the movable deck is in each of the two positions which it is capable of assuming.

8 Claims, 8 Drawing Figures

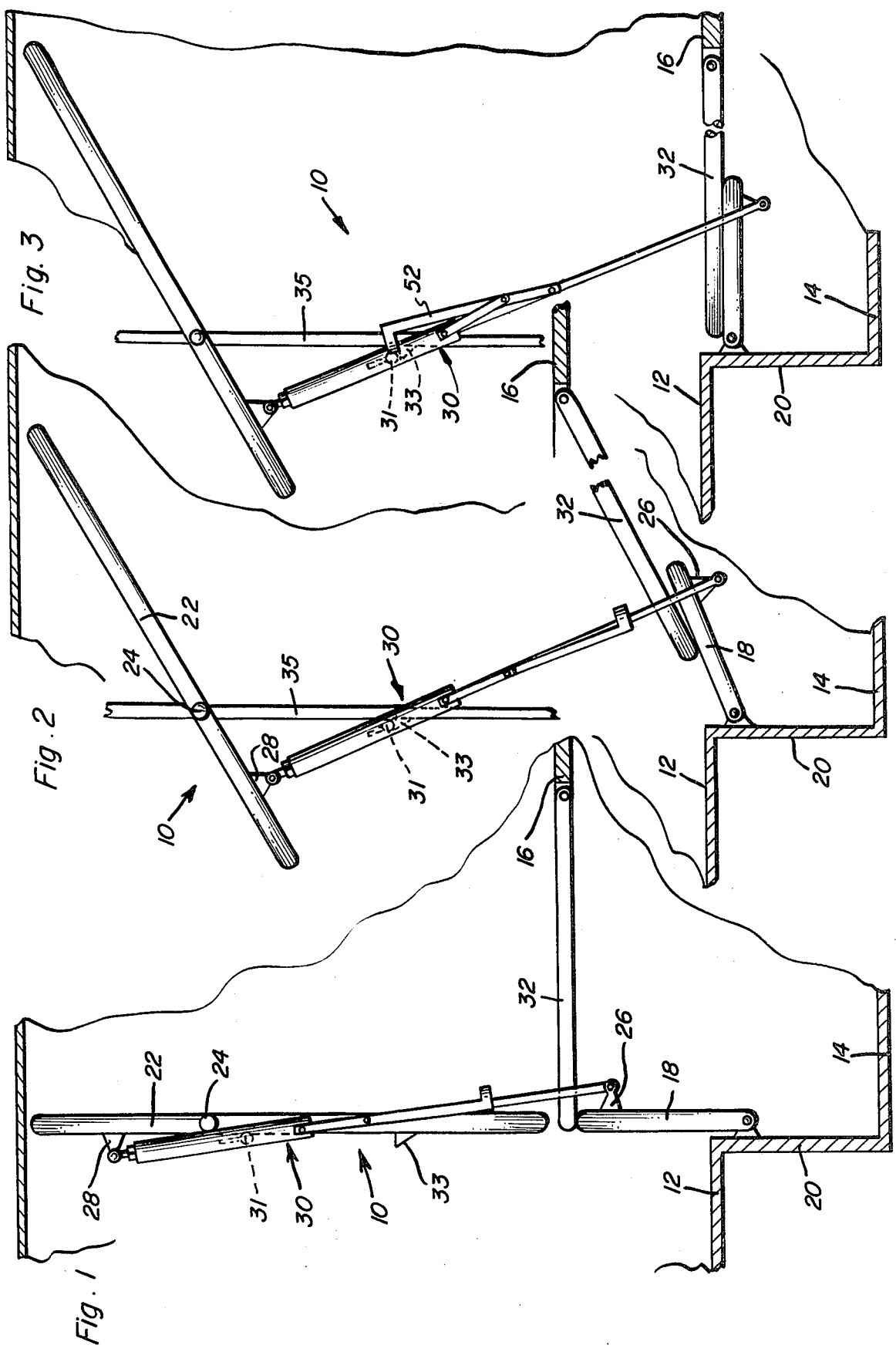

TELESCOPING REACH ROD FOR GATE AND RAMP DEVICE WITH LIFT DECK

BACKGROUND OF THE INVENTION

1. Field of the Invention

This invention relates to livestock trailers having compartments for retaining livestock therein and more particularly pertains to such trailers which have a movable deck mounted therein incorporating gate and ramp structures for facilitating loading and unloading of livestock to the movable deck.

2. Discussion of Related Art

In the manufacture of trailers designed for the transporation of livestock, it is desirable to produce a trailer which is easily adaptable for hauling a variety of animals. To this end, the trailer disclosed in U.S. Pat. No. 2,970,861, issued Feb. 7, 1961, to Short, was developed. The Short carrier provides a double deck livestock configuration which may be employed for hauling small animals, such as hogs and sheep, and convertible from double deck to single level carriers for hauling cattle, and the like. The Short structure includes a movable deck positioned in a drop center trailer over the drop center portion of the trailer. While such a configuration provides numerous benefits and flexibility of utilization, it presents a problem in providing a readily available means of loading animals onto the movable deck portion when disposed in its various locations.

U.S. Pat. No. 3,292,967, issued Dec. 20, 1966, to Peek, shows a gate and ramp device for facilitating loading and unloading of livestock onto a drop center trailer having a second deck disposed over the drop center portion of the trailer. The Peek device, however, does not provide accommodation for loading animals from a second deck provided at a position other than a predetermined fixed position.

SUMMARY OF THE INVENTION

It is one object of the present invention to provide a gate and ramp device similar to that shown in the above mentioned Peek patent which is easily adapted for use with a lift deck capable of assuming a plurality of positions.

Another object of the present invention is to provide a means of loading and unloading the upper front section onto the lift deck without lowering the lift to be inclined with the upper front floor section.

A further object of the present invention is to provide a gate and ramp device incorporating a telescoping reach rod for allowing the lower section of a sectional gate structure to assume a plurality of positions to accommodate several heights of the movable deck.

Yet a still further object of the present invention is to provide a telescoping reach rod for a gate and ramp device which is simple in construction and which is easily manipulated for moving the lower section of the gate between a plurality of positions.

In accordance with the above objects, a gate and ramp device is provided for use with a lift deck in a drop center trailer. The ramp is hingedly attached to the lift deck and movable therewith. The gate device has an upper gate section pivotally attached to the walls of the trailer and movable between a first substantially vertical position and a second inclined position with one end of the upper portion of the reach rod resting against a stop to provide support for the lower gate section which is held at an inclined position by a reach rod which extends between the upper and lower sections. The ramp rests upon the lower section to provide access to the lift deck. The position of the lower section is adjustable by adjusting the effective length of the reach rod. The reach rod is composed of two main sections with one section being telescopingly received within the other section. An over center linkage mechanism is connected between the portions of the reach rod. In one position of the linkage mechanism, the inner member is extended causing the lower gate section to lie horizontally with the ramp resting horizontally on top of it. In the other position, the linkage holds the inner telescopic section in a retracted position thereby inclining the lower gate section to accommodate the ramp when the lift deck is in a raised position.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of the gate and ramp device in the gate mode with the lift deck in its raised position.

FIG. 2 is a side elevational view of the gate and ramp device in the ramp mode with the lift deck in its raised position.

FIG. 3 is a side elevational view of the gate and ramp device with the lift deck in its lowered position.

DESCRIPTION OF THE PREFERRED EMBODIMENT

Figure 4:
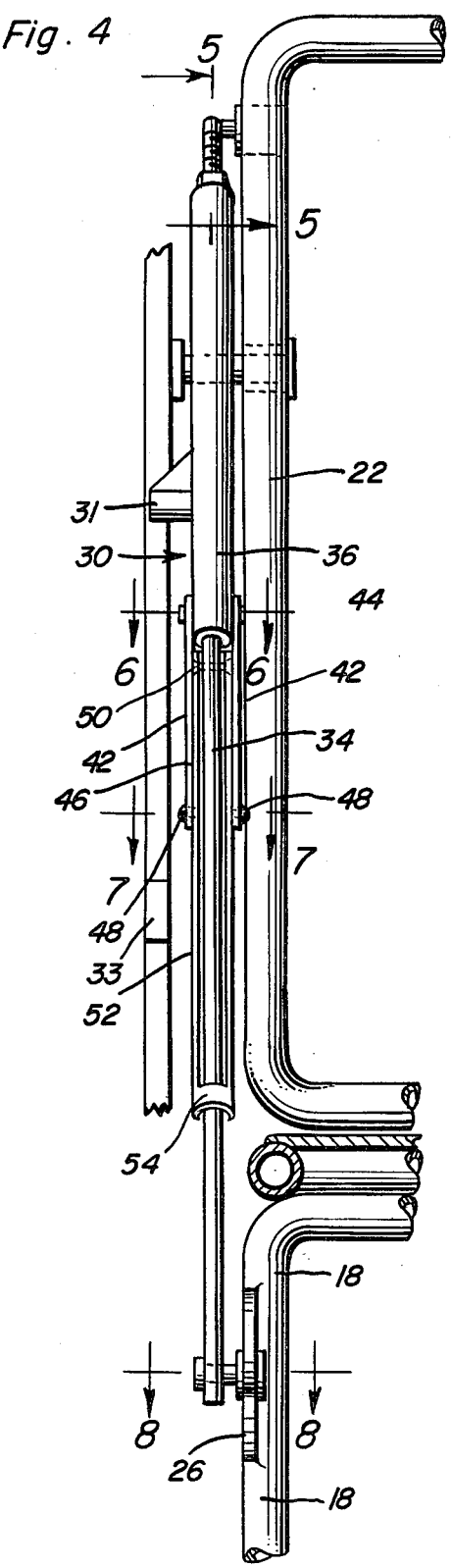
FIG. 4 is an elevational fragmental view of the gate and ramp device showing the telescoping reach rod in detail.
Figure 5:
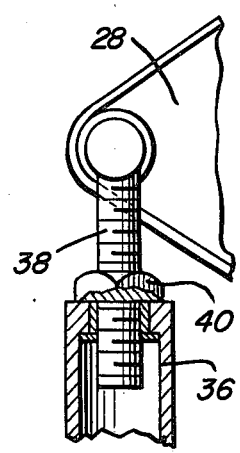
FIG. 5 is a detailed sectional view taken substantially along a plane passing through section line 5—5 of FIG. 4.
Figure 6:
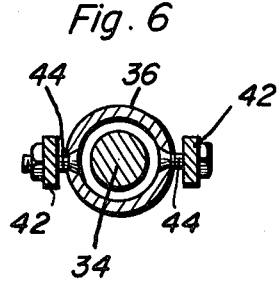
FIG. 6 is a plan sectional view taken substantially along a plane passing through section line 6—6 of FIG. 4.
Figure 7:
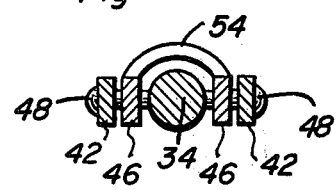
FIG. 7 is a sectional elevational view taken substantially along a plane passing through section line 7—7 of FIG. 4.
Figure 8:
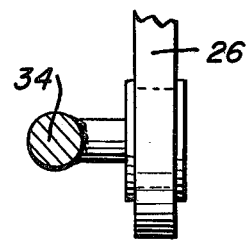
FIG. 8 is a plan sectional view taken substantially along a plane passing through section line 8—8 of FIG. 4.

Now with reference to the drawings, a gate and ramp device with a telescoping reach rod incorporating the details of the present invention and generally referred to by the reference numeral 10 will be described in detail. Initially with reference to FIGS. 1 through 3, there can be seen a drop center trailer having an upper floor section 12 and a drop center portion 14. The trailer is also provided with a movable lift deck 16 which can be vertically adjusted with an arrangement substantially as shown and described in the aforementioned U.S. Pat. No. 2,970,861, which is incorporated herein by reference thereto. Lift deck 16 is adapted to be disposed in one of two positions. The first position of lift deck 16 is shown in FIGS. 1 and 2 wherein the deck is vertically spaced a predetermined height above the level of upper floor 12. FIG. 3 shows the lift deck in its lowered position wherein it is aligned with the upper floor 12. With the lift deck in the position of FIGS. 1 and 2, livestock can be loaded on the lift deck 16 and onto the upper floor 12 which is located in the front of the trailer. With the configuration of FIG. 3, straight through loading of freight or livestock can be accomplished.

To facilitate loading of livestock onto the upper floor 12, the gate and ramp device 10 is employed. Device 10 operates by the same principles as disclosed in the aforementioned U.S. Pat. No. 3,292,967, which is incorporated herein by reference thereto. The device 10 includes a lower gate section 18 which is pivotally connected to vertical wall 20 of the drop center portion of the trailer and spaced below the position of upper floor 12 by a distance equal to approximately the depth of the lift deck 16. An upper gate section 22 is pivotally connected to the sides of the trailer body by pivot pins 24. A V-shaped bracket 26 is rigidly attached to the lower gate 18 and a similar bracket 28 is attached to the upper gate 22. The brackets 26 and 28 extend in opposite directions from their respective gates and are interconnected in a movable arrangement by reach rod 30. Rod 30 is pivotally connected to each of brackets 26 and 28 at the opposite ends of the rod. Accordingly, with the rod 30 in the position shown in FIGS. 1 and 2, the gate and ramp apparatus operates exactly as disclosed in the aforementioned U.S. Pat. No. 3,292,967. A ramp 32 is pivotally connected to the end of lift deck 16 and is supported by the top of lower gate 18 in a horizontally aligned relationship with the lift deck when the upper and lower gates are disposed in the gate mode with both gates vertically aligned, as seen in FIG. 1.

As seen in FIG. 2, the lower end of upper gate 22 has been swung rearwardly and upwardly about pivot pins 24 until stop member 31, connected to the upper portion of reach rod 30, has engaged stop support 33 which is located on the gate frame 35. Through the action of rod 30, the lower gate 18 is also pivoted rearwardly and is disposed in an inclined position being held there by virtue of engagement of stop member 31 and stop support 33. Ramp 32 has angled downwardly under gravity and remains in contact and is supported by lower gate 18. In this manner, livestock which are loaded onto the deck 16 can be allowed to walk from that deck over ramp 32 onto the upper floor 12 and thereby fill the forward compartment of the trailer. Livestock in the forward compartment and on deck 16 can be separated and maintained in their respective positions by merely moving the device 10 to its original vertical position as shown in FIG. 1, wherein it acts as a gate.

Now with reference to FIGS. 4 through 8, the details of construction of the interconnection of the reach rod 30, upper gate 22 and the lower gate 18 can more clearly be understood. Reach rod 30 is composed of two basic elements with inner rod 34 being telescopically received in outer rod 36. At its upper end, outer rod 36 is pivotally attached to the V-bracket 28 through threaded stud 38 which is received in threaded sleeve 40. Minor adjustments of the length of the rod 30 can be effected through rotation of sleeve 40 as is evident. One end of inner rod 34 is pivotally attached to the bracket 26. Rods 34 and 36 are held in engagement through a linkage mechanism comprising a pair of short link members 42 which are connected at one end to outer rod member 36 by pivot pins 44. The opposite end of short link member 42 is pivotally attached to long link member 46 medially thereof by pivot pins 48. One end of the long link member 46 is pivotally connected to the inner rod 34 by pivot pin 50. The opposite end of the long link member extends away from its pivot connections to form a handle portion 52. The end of the handle 52 contains arcuate connector portion 54 which attaches both sides of the long link member together. Handle 52 provides an over center action for the linkage mechanism and operates to hold inner rod member 34 in either a retracted position as shown in FIGS. 1, 2 and 4 or in an extended position as shown in FIG. 3. In the retracted position, the handle is moved downward and the pivot pins 48 are rotated past alignment with pivot pin 50. In this case, when tension is applied to the inner rod member, 34 the arcuate connector 54 is merely forced into firmer engagement with the inner rod and the reach rod 30 maintains its configuration. In order to change the reach rod 30 to its extended configuration, the handle 52 is merely rotated about pivot pins 48 thus extending the inner rod 34 from the outer rod 36, as shown in FIG. 3.

Again with reference to FIG. 3, it can be seen that the lift deck 16 is disposed in its lowered position wherein it is in alignment with the upper floor 12. With the configuration shown in FIG. 3, the trailer is provided with an essentially flat floor for carrying larger animals or providing for complete access to the entire trailer for loading freight, or the like.

The conversion from one mode of operation to another can easily be produced by a single employee. Merely by changing the height of deck 16 and adjusting the length of reach rod 30 through manipulation of handle 52, the appropriate trailer configuration can be obtained. When the deck 16 is in its upper position, the ramp mode of FIG. 2 or gate mode of FIG. 1 of the device 10 can easily be selected by merely rotating upper gate 22 about pivot pins 24 for facilitating the loading or unloading of animals in the trailer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a compartment for retaining livestock, said compartment having sidewalls, a base floor and an upper platform disposed between said sidewalls within said compartment: a ramp hingedly connected to said platform, a lower gate, a hinge means connected to said base floor, one end of said lower gate being connected to said hinge means, an upper gate, a hinge arrangement connecting said upper gate to said sidewalls, and a telescoping rod hingedly connected between said upper and lower gates and including first and second operably associated members, said first member being slidably received into a hollow interior portion of said second member, said telescoping rod including adjustment means connected thereto for causing a change in an effective length of said rod between an extended position and a retracted position, said effective length corresponding to a slidable movement of said first and second members relative to one another.

2. The apparatus of claim 1 and further wherein said compartment comprises an interior of a drop center trailer, and said platform comprises a deck disposed over the drop center portion of said trailer, said deck being vertically movable within said compartment.

3. The apparatus of claim 1 and further wherein said adjustment means includes a linkage means operably movable to effect a telescoping movement of said first member and said second member relative to one another.

4. The apparatus of claim 3 and further wherein said linkage means includes a first link having one end thereof pivotally attached to said first member and a second link pivotally attached at one end thereof to said second member, another end of said second link being pivotally attached to said first link.

5. The apparatus of claim 4 and further wherein said another end of said second link is pivotally attached to said first link at a midportion thereof.

6. The apparatus of claim 5 and further wherein a remaining free end of said first link includes an arcuate connector formed thereon, said arcuate connector being abuttable against said first member when said rod is in said extended position and abuttable against said second member when said rod is in said retracted position.

7. The apparatus of claim 6 and further wherein a stop member is provided on said second member and a stop support is provided on said upper gate, said stop member being abuttable against said stop support when said ramp is in a lowered position whereby said livestock may freely move across said ramp between said base floor and said upper platform.

8. In a compartment for retaining livestock, said compartment having sidewalls, a base floor and an upper platform disposed between said sidewalls within said compartment: a ramp hingedly connected to said platform, a lower gate, a hinge means connected to said base floor, one end of said lower gate being connected to said hinge means, an upper gate, a hinge arrangement connecting said upper gate to said sidewalls, and an overcenter linkage means hingedly connected between said upper and lower gates, said overcenter linkage means being operable to cause a change in an effective length of said rod between an extended position and a retracted position, said effective length corresponding to an overcenter movement of said overcenter linkage means.

* * * * *